United States Patent [19]

Hanma et al.

[11] Patent Number: 4,500,925
[45] Date of Patent: Feb. 19, 1985

[54] AUTO-FOCUSING SYSTEM FOR VIDEO CAMERA

[75] Inventors: Kentaro Hanma; Toshio Murakami; Yoshihiro Todaka, all of Yokohama, Japan

[73] Assignee: Hitachi, Ltd., Tokyo, Japan

[21] Appl. No.: 390,643

[22] Filed: Jun. 21, 1982

[30] Foreign Application Priority Data

Jun. 26, 1981 [JP] Japan .................................. 56-98246
Mar. 31, 1982 [JP] Japan .................................. 57-51250

[51] Int. Cl.³ ............................................. H04N 5/26
[52] U.S. Cl. .................................................. 358/227
[58] Field of Search ................. 358/227, 225; 354/195

[56] References Cited

U.S. PATENT DOCUMENTS 3,617,633 11/1981 Barr ...................................... 358/227
4,301,478 11/1981 Sakane ................................. 358/227
4,320,417 3/1982 Hanma ................................. 358/227
4,354,204 10/1982 Kimura ................................ 358/227

FOREIGN PATENT DOCUMENTS 3331 11/1977 Japan ................................... 358/227

Primary Examiner—Tommy P. Chin
Attorney, Agent, or Firm—Antonelli, Terry & Wands

[57] ABSTRACT

An auto-focusing system for a video camera using the focus signal extracted by a focus signal extracting device from high-frequency components of the video signal. A gate circuit is provided in front of the focus signal extracting device and the gate circuit is made conductive or non-conductive depending on the magnitude of the focus signal thereby to control the quantity of the video signal received by the focus signal extracting device, whereby the dynamic range of the focus signal extracting device is virtually expanded.

15 Claims, 15 Drawing Figures

| | RAM |
|---|---|
| ADDRESS 100 | CURRENT FOCUS SIGNAL |
| ADDRESS 101 | PREVIOUS FOCUS SIGNAL |
| ADDRESS 102 | MAX FOCUS SIGNAL |
| ADDRESS 103 | MIN FOCUS SIGNAL |
| ADDRESS 104 | HIGH THRESHOLD |
| ADDRESS 105 | LOW THRESHOLD |
| ADDRESS 106 | CURRENT GAIN |

AUTO-FOCUSING SYSTEM FOR VIDEO CAMERA

BACKGROUND OF THE INVENTION

1. Field of the Invention

The present invention relates to an auto-focusing system and, particularly, to an auto-focusing system for a video camera.

2. Description of the Prior Art

It is known, as a method of auto-focusing by utilization of the properties of the video camera, the step-by-step control method wherein the definition of the picture is detected using high frequency components of the video signal and the distance setting ring (will be termed "helicoid" hereinafter) of the lens is rotated under control so as to obtain the best definition. This method is described in detail in an article entitled, "Automatic Focus Adjustment for TV Camera by Step-by-step Servo System", by Ishida et al., NHK Technical Report, Vol. 17, No. 1 (1965), Serial No. 86, page 21. This method will first be explained briefly in connection with FIGS. 1 and 2.

FIG. 1 shows in block diagram the arrangement of the auto-focusing system using the step-by-step control method. The arrangement includes a lens system 1, a camera circuit 2, a video signal output terminal 3, a high-pass filter (HPF) 4, a detector 5, a difference holding circuit (serves as the combination of a differential circuit and a sample holding circuit) 6, a motor drive circuit 7, and a motor 8 for turning the helicoid in the lens system 1.

The operation of the arrangement shown in FIG. 1 will be described referring to the characteristic graphs in FIG. 2. The incident ray from an object is focused by the lens system 1, then converted into the electrical signal by the camera circuit 2, which provides at the terminal 3 the video signal for the object. The high-pass filter (HPF) 4 extracts high frequency components of the video signal and the detector 5 detects the high frequency components and provides a voltage signal at terminal 51. Since the voltage at the terminal 51 (will be termed "focus signal": curve (1) in FIG. 2) represents the definition of the picture, it becomes maximum when the helicoid position (A) of the lens system 1 is set exactly corresponding to the distance between the object and the lens system 1, while it decreases as the helicoid setting deviates from the object distance. In FIG. 2, curves (2) and (3) show the output signal level at terminal 61 when the helicoid position is moved from proximity to infinity and from infinity to proximity, respectively.

FIG. 2 suggests that if the helicoid position is controlled by some means as if one ascends the slope of the focus signal curve so as to lead the helicoid position to the peak where the focus signal has the maximum value, then automatic focusing will be achieved. This process is carried out by the circuit portion including the difference holding circuit 6, the motor drive circuit 7 and the motor 8 in FIG. 1. The motor 8 moves the helicoid position, while the difference holding circuit 6 samples and holds the focus signal on the terminal 51 at a certain interval and provides a positive voltage if the sampled signals show a positive variation (i.e. ascent) or provides a negative voltage if the sampled signals show a negative variation (i.e. descent). The motor drive circuit 7 keeps the turning direction of the motor 8 to ascend the slope of curve when the difference holding circuit 6 provides a positive voltage, or reverses the turning direction to take the ascending direction when the circuit 6 provides a negative voltage. Thus the helicoid position control loop shown in FIG. 1 leads the helicoid position to ascend the slope of the focus signal by referring to the output voltage of the difference holding circuit 6, and eventually the helicoid position will zigzag to the peak of the curve. By detecting the arrival at the peak point, the lens position is fixed and auto-focusing is completed.

The auto-focusing system by step-by-step control for a video camera has been described. This method uses the picture signal to carry out the focusing operation and realize an inexpensive and accurate auto-focusing system with the simpler structure and less initial adjustments as compared with the system having a closed-loop helicoid position control based on an independent distance metering device. However, the foregoing method has the following problems related to the dynamic range of the focus signal. The amplitude of the video signal from the camera circuit 2 is controlled to have a constant level by the automatic or manual gain control circuit within the camera circuit 2, while the output of the detector 5 is responsive to the amount of high frequency components included in the video signal, i.e., energy included in the output of the HPF 4. Therefore, if the picture has little high-contrast vertical line components, the detector 5 receives from the HPF 4 a less number of pulses with small amplitude, resulting in a small peak on the curve of the focus signal. On the other hand, if the picture has much high-contrast vertical line components, the detector 5 receives a large number of pulses with larger amplitude, resulting in a large peak on the curve of the focus signal. In the actual picture signal, there is a great difference between these peaks, that extends, according to an experiment, about 1 to 200.

Since the dynamic range of the focus signal is limited mainly by the power voltage, the detector 5 is designed so that it is not saturated for the abovementioned higher peak. Therefore, the detector 5 provides a lower voltage for a picture having less vertical line components, causing the difference holding circuit 6 to fail to operate, and the circuit does not provide the output voltage responsive to the full range of the focus signal. Conversely, if the detector 5 is designed so as to provide a sufficient output voltage for a picture having less vertical line components, it will be saturated by a high-contrast picture, resulting in a flattened peak on the curve of the focus signal. Also in this case, the difference holding circuit 6 does not receive a correct signal, and the accurate ascending operation cannot be expected.

SUMMARY OF THE INVENTION

It is an object of the present invention to solve the foregoing prior art deficiencies and provide an auto-focusing system which performs a satisfactory step-by-step operation irrespecitve of the amount of vertical line components in the picture.

It is another object of the invention to solve the foregoing prior art deficiencies and provide an auto-focusing system for a video camera capable of satisfactory focusing for any object.

According to one aspect of the present invention, there is provided an auto-focusing system comprising a video camera and a focus signal extracting means which receives the video signal produced by the video camera and provides a focus signal representing the focal matching of the lens system, the focus signal being used to control the lens system of the video camera, the system further comprising a gate circuit provided in front of or inside the focus signal extracting means and the gate is operated so that the amount of the video signal entered to the focus signal extracting means is controlled. The operation mentioned above is equivalent to the automatic gain control for a detector means within the focus signal extracting means. The gate is made conductive or non-conductive depending on the amount of high-frequency components in the video signal, and the amount of the high-frequency components is determined by counting the number of profiles in the picture or obtained directly from the output of the focus signal extracting means.

According to the invention, video signals supplied to the focus signal extracting means is picked off depending on the amount of the high-frequency components in the video signal thereby to prevent the saturation of the detector means. Preferably, video signals are reduced in units of horizontal scanning lines, and the gate circuit is controlled to conduct all horizontal scanning lines, conduct every two lines or conduct every 3–64 lines depending on the amount of the high-frequency components in the video signal. In estimating the amount of high-frequency components, the number of profiles in a picture in the video signal is counted, for example, over one field period, or alternatively, the output of the focus signal extracting means is compared with a predetermined threshold value by a threshold circuit. The threshold circuit is preferably constituted by a first circuit having a threshold value in proximity of the saturation level of the focus signal extracting means and a second circuit having a threshold value in proximity of the null signal level. According to the invention, the threshold values of the threshold circuits are set automatically when the auto-focusing operation is initiated.

DESCRIPTION OF THE PREFERRED EMBODIMENTS

The invention will now be described with reference to the drawings.

The first embodiment of the invention will be described in detail in connection with FIGS. 3, 4A and 4B. The principle of this embodiment is as follows. High-contrast vertical line components included in the picture signal (i.e., vertical profile portions of the picture) are extracted and counted. The video signal is gated in units of scanning lines according to the count so that video signals transferred to the detector in the focus signal extracting means are partly neglected thereby to prevent the detector from being saturated. This principle is based on the fact that the picture signal corresponding to the profile portion includes much high-frequency components.

Figure 1:
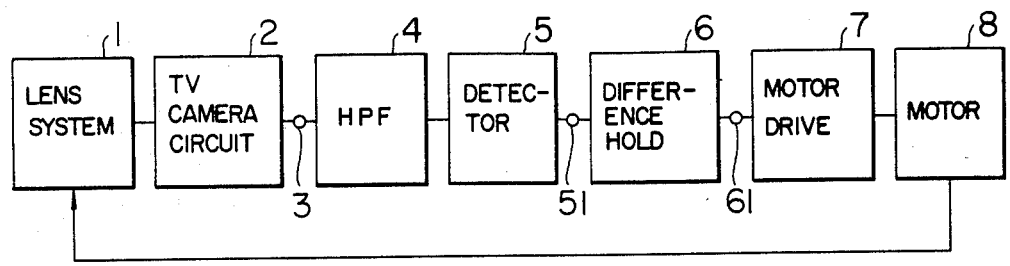
FIG. 1 is a block diagram showing the conventional auto-focusing system.
Figure 2:
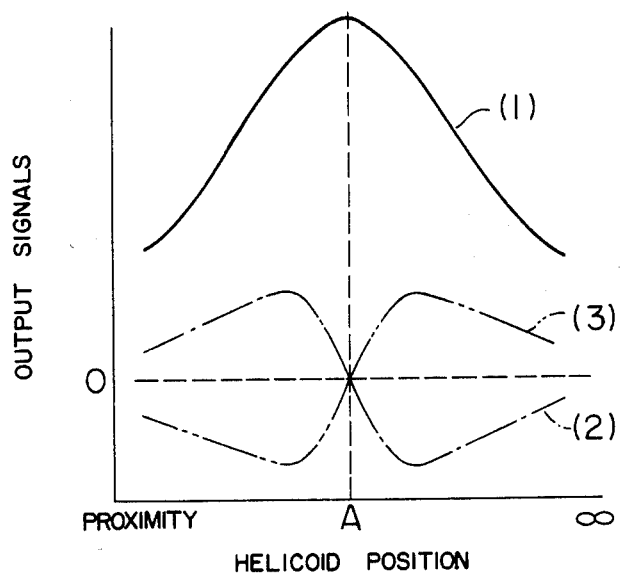
FIG. 2 is a graphical representation explaining the principle of operation of the arrangement shown in FIG. 1.
Figure 3:
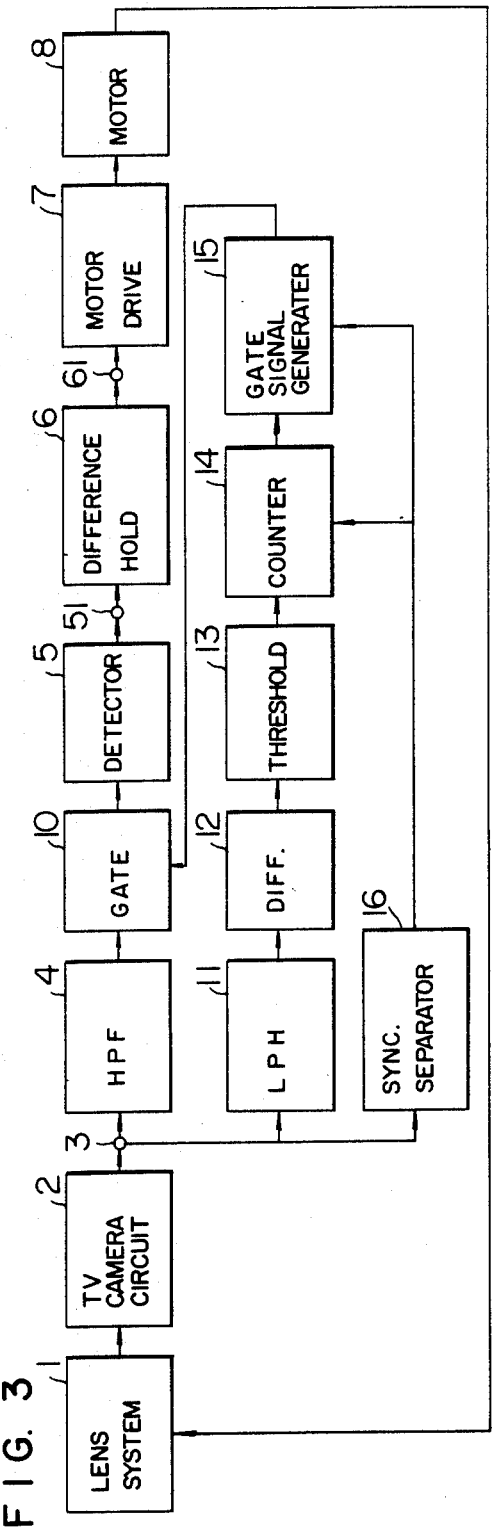
FIG. 3 is a block diagram showing an embodiment of the present invention.

In FIG. 3, the portions including in a lens system 1, a camera circuit 2, a terminal 3, an HPF 4, a detector 5, a difference holding circuit 6, a motor drive circuit 7, a motor 8, and terminals 51 and 61 are the same as the arrangement of the conventional auto-focusing system described in connection with FIG. 1. The arrangement of the present invention in FIG. 3 further includes an electronic switch 10 which functions as a gate, a low-pass filter (LPF) 11, a differentiating circuit 12, a threshold amplifier 13, a counter 14, a gate signal generator 15, and a sync separator 16. In the arrangement of FIG. 3, if the gate 10 is kept conductive, the closed loop including the lens system 1 through the motor 8 is exactly the same as the arrangement of the conventional auto-focusing system shown in FIG. 1, and the explanation will be omitted.

First, means for obtaining the signal representing the number of vertical profiles in the picture signal will be described. The video signal produced by the camera circuit 2 is fed through the LPF 11 to the differentiating circuit 12, which then provides signals responsive to profile portions of the picture. The purpose of the LPF 11 is to prevent the differentiating circuit 12 from responding too sharply for out-focused portions of the picture, and the LPF 11 preferably has a cut-off frequency of several hundred kHz or lower. Since the output of the LPF 11 includes high-frequency components of 100 kHz or higher, it is quite possible to obtain the profile information in the picture signal.

The output of the differentiating circuit 12 is passed through the threshold circuit 13 so that profile components having lower contrast than the predetermined threshold are eliminated, then profile pulses are counted by the counter 14. The counter 14 is cleared by the output signal of the sync separator 16 at an interval of the vertical sync signal, and thus the counter 14 counts the number of profiles in one field of picture after the scanning has started at the top left corner of the frame and before it ends at the bottom right corner of the frame.

Figure 4A:
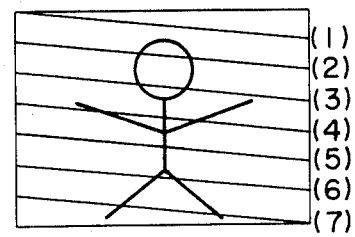
FIGS. 4A and 4B are illustrations useful to explain the gain control of the present invention.
Figure 4B:
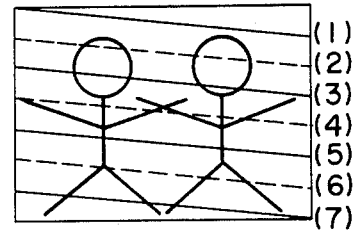

FIG. 4A illustrates the production of a picture on the screen, where for purposes of simplicity only seven scanning lines (1)–(7) are shown. (Actually the standard NTSC television system employs 262.5 scanning lines for one field.) In this picture, scanning line (1) encounters no profile, scanning line (2) encounters two profiles, and so on, and the counter 14 will count a total of 12 profiles.

Next, the automatic gain control by the signal representing the number of profiles will be described. The signal representing the number of profiles provided by the counter 14 is passed to the gate signal generator 15. If the circuit 15 receives a count value smaller than a preset value, it operates on the gate circuit 10 to keep conductive, or if the circuit 15 receives a count value larger than the preset value, it operates on the gate circuit 10 with reference to the horizontal and vertical sync signals from the sync separator 16 so that the gate conducts high-frequency video signals at an interval of every two scanning lines thereby to reduce the entry of the signals to the detector 5. FIG. 4B shows the result of this operation, where the gate 10 is conductive for scanning lines (1), (3), (5) and (7), whereas it is non-conductive for scanning lines (2), (4) and (6).

In the example of FIG. 3, the gate signal generator 15 operates on the gate 10 to be conductive continuously or to be conductive for every two scanning lines depending on the count received. However, arrangement may be made such that the gate circuit operates to conduct the signal for every three, five or nine scanning lines, or alternatively, the gate operates for every two or three scanning lines for the upper and lower portions of the screen and the gate operates continuously for the central portion of the screen. The gate signal generator 15 is not described in detail here, however, it can be achieved easily as will be described in detail in connection with the second embodiment. The gate circuit 10 which is located at the output of the HPF 4 in the arrangement of FIG. 3, however, it may be placed in front of the HPF 4.

Figure 5:
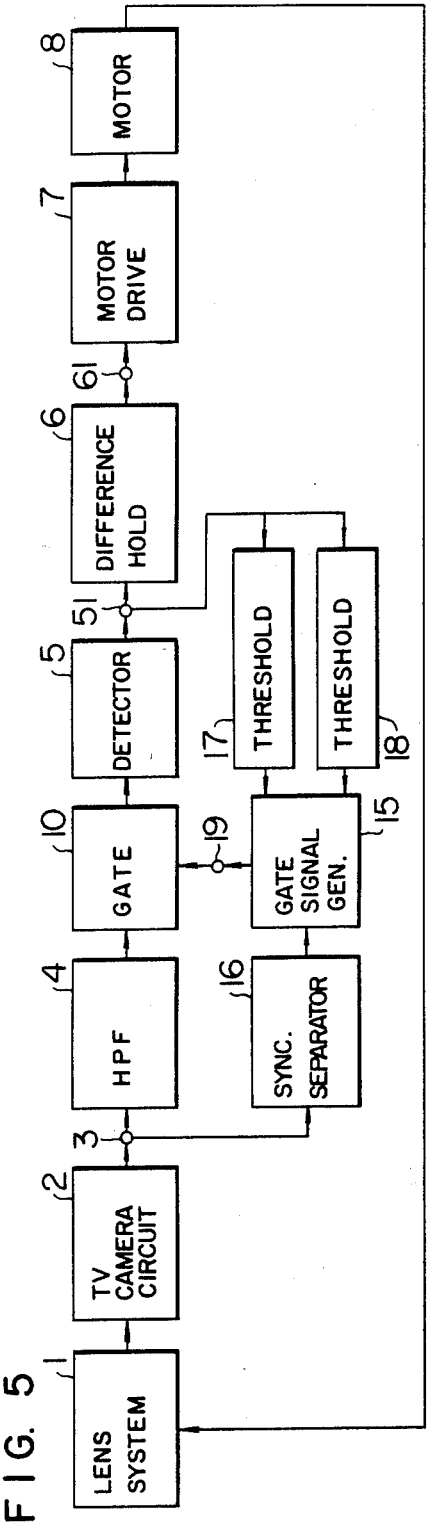
FIG. 5 is a block diagram showing another embodiment of the invention.
Figure 6:
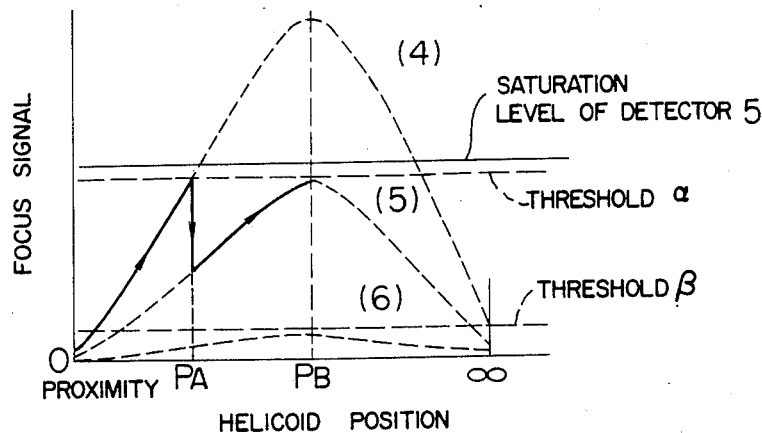
FIG. 6 is a graphical representation explaining the embodiment of FIG. 5.

The second embodiment of the invention will be described with reference to FIGS. 5 and 6. In this embodiment, two threshold circuits are provided at the output of the detector in the focus signal extracting means, instead of using the above-mentioned profile counter, with one threshold value being set to the approximate saturation level of the detector and with another threshold value being set to the approximate null signal level of the detector. The outputs of the threshold circuits are supplied to the gate signal generator so that video signals are gated in units of scanning lines. In FIG. 5, the blocks with reference numbers 1, 2, 3, 4, 5, 6, 7, 8, 51, 61, 10, and 16 are the same constituents as shown in FIG. 3, while the new arrangement further includes a gate signal generator 15', threshold circuits 17 and 18, and a terminal 19. In the arrangement of FIG. 5, if the gate circuit 10 is kept conductive, it is difficult merely by adjusting the gain of the detector 5 to obtain the characteristics of the focus signal at the output of the difference holding circuit 6, as shown by curve (5) in FIG. 6, without occurrence of saturation at the peak, while providing a satisfactory signal range responsive to the helicoid position. Instead, a sufficient signal range cannot be obtained when the number of profiles is small as shown by curve (6), or the signal exceeds the saturation level of the detector 5, causing the peak portion of the curve to be flattened, when the number of profiles is large as shown by curve (4) in FIG. 6. In the arrangement of FIG. 5, the threshold circuit 17 has been set to have a threshold of $\alpha$ in proximity to the saturation level of the detector 5, and the threshold circuit 18 has been set to have a threshold of $\beta$ in proximity to the null signal level of the detector 5. The gate signal generator 15' operates on the gate circuit 10, with reference to the outputs of the threshold circuits 17 and 18 responsive to the focus signal at the terminal 51, to be conductive or non-conductive. Thus the number of pulses supplied from the HPF 4 to the detector 5 is reduced, whereby the virtual gain of the detector 5 is controlled.

In this arrangement, when the focus signal is below the threshold $\beta$, the gate signal generator 15' operates on the gate circuit 10 to become conductive more frequently, while when the focus signal exceeds the threhsold $\alpha$, the gate circuit 10 is made conductive less frequently, whereby the focus signal is maintained within the voltage range between $\beta$ and $\alpha$, i.e., the dynamic range of the detector 5.

Figure 7:
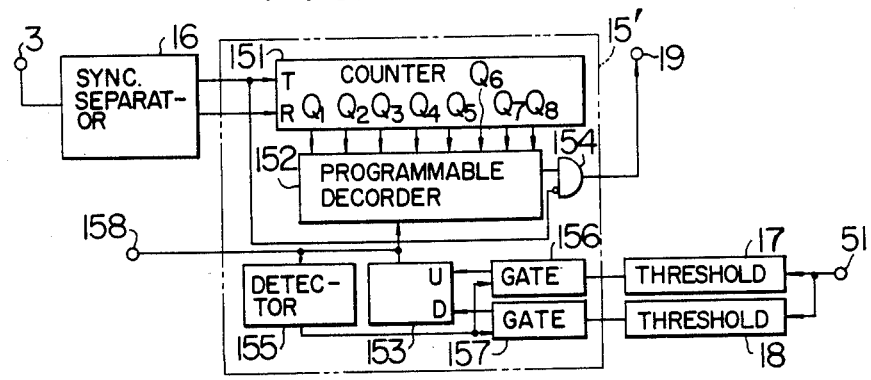
FIG. 7 is a block diagram showing in detail in part the arrangement shown in FIG. 5.

FIG. 7 shows in block diagram an example of the gate signal generator 15' for controlling the gate circuit 10, and the arrangement includes a counter 151, a programmable decoder 152, an up/down counter 153, an AND gate 154, a means 155 for detecting the variation of the contents of the up/down counter 153, and gate circuits 156 and 157. The counter 151 receives at its count terminal T the horizontal sync signal from the sync separator 16, and at its reset terminal R the vertical sync signal (one pulse per field), and therefore the contents of the counter which appear at it outputs Q1-Q8 indicate the scanning line number. The up/down counter 153 is cleared when the auto-focusing operation starts, thereafter it is incremented in response to the output the threshold circuit 17 through the gate circuit 156, i.e., each time the focus signal exceeds the threshold $\alpha$, while it is decremented in response to the output of the threshold circuit 18 through the gate circuit 157, i.e., each time the focus signal goes down below the threshold $\beta$.

The programmable decoder 152 carries out control in co-operation with the AND gate 154 in accordance with the predetermined rule such that the gate circuit 10 conducts all horizontal scanning signals, every two signals or every three signals depending on the contents of the up/down counter 153. As a particular example, there is arranged the gain switching of seven steps ranging from passing all scanning lines to passing one scanning line at an interval of 64 lines. In this arrangement, output pulses from the HPF 4 are picked off in units of scanning lines by control of the gate circuits 156 and 157 each time the gain switching operation occurs. The variation detecting means 155 operates on the gate circuits 156 and 157 to be conductive when the up/down counter 153 does not vary its contents, while the circuits are made non-conductive only at the moment when the up/down counter 153 varies the contents, whereby the up/down counter 153 does not count up or down when the focus signal resides between the thresholds $\alpha$ and $\beta$, but it counts up or down continuously when the focus signal is above the threshold $\alpha$ or below the threshold $\beta$, respectively. The variation detecting means 155 can easily be designed by those who are skilled in digital circuit technologies and explanation thereof will be omitted.

The operation of the auto-focusing system shown in FIG. 5 will further be described in connection with FIG. 6. Assuming that the auto-focusing operation starts with the lens system 1 located initially at the proximity position, the focus signal resides below the threshold $\beta$, causing the gate circuit 10 to pass HPF output pulses for all horizontal scanning lines, and the focus signal voltage starts to ascend along the curve (4) in FIG. 6. When the lens position has reached point PA at which the threshold circuit 17 detects that the focus signal goes beyond the threshold $\alpha$, the up/down counter 153 is incremented. Then, due to the action of the programmable counter 152, the terminal 19 provides signals for every two horizontal scanning lines, causing the gate circuit 10 to pass approximately half the output pulses thereby to reduce the focus signal level by half. After that, the focus signal voltage will ascend along curve (5) until the lens position reaches point PB which is the exact focus point for the object, and the auto-focusing operation completes.

Although in the above example the gain was switched only once, it will be appreciated that the gain is switched again when the focus signal voltage exceeds the threshold $\alpha$ in ascending along the curve (5). Also in the above example, the focus signal started to ascend along the curve (4) for passing all scanning lines since the initial value of the focus signal was smaller than the threshold $\beta$. However, it is not important to pass all scanning lines at the beginning of the operation, but what is important is to establish the gain so that the focus signal resides between the thresholds $\alpha$ and $\beta$ before starting the operation. The ascending operation accompanied by gain switching is not only advantageous for maintaining the focus signal within the dynamic range of the detector 5 continuously, but also provides an accurate ascending operation since it takes the steepest ascending path while the focus signal is small and gradually it swaps for smaller gain so that the detector 5 provides a sufficient voltage difference for the difference holding circuit 6. This is obvious from the comparison with another gain control method, in that if the focus signal at the exact focal position PB is predicted by some means and the ascending operation starts along the curve (5) in FIG. 6, the gradient of the ascending slope between the start position and the lens position PA is half that of the present invention.

Although it was not mentioned in the above description, the magnitude of the focus signal is significantly reduced by the gain switching operation, causing the difference holding circuit 6 to provide an output voltage which directs a reverse rotation of the motor 8. However, it is obvious that the motor drive circuit 7 should be arranged so that the motor 8 is rotated continuously in the same direction even for such transitional focus signal. This operation takes place in such a way that when the gain switching has occurred, the focus signal immediately after the switching is set as the initial value. The motor 8 is kept running in the same direction as before, and the focus signal obtained subsequently is compared with the initial value. If the focus signal is found increasing, the normal ascending control is restored, or if the signal is found decreasing, the lens position at the time of gain switching is assumed to be the exact focal position and the lens system is moved back and held at that position. By the foregoing method, a satisfactory auto-focusing operation is achieved.

The programmable decoder 152 may be provided with an additional function that conducts no horizontal scanning lines for the contents of the counter 151 ranging, for example, from 0 to 79 and from 185 to 262.5 irrespective of the contents of the up/down counter 153, so that the output signal of the HPF 4 which generates the focus signal is restricted to the area of 106 scanning lines in the central portion of the screen. Then gain control by reducing the number of scanning lines is carried out within the area, and the picture can be focused for the limited frame, thereby eventually improving the operationability of the video camera incorporating the auto-focusing system.

Figure 8:
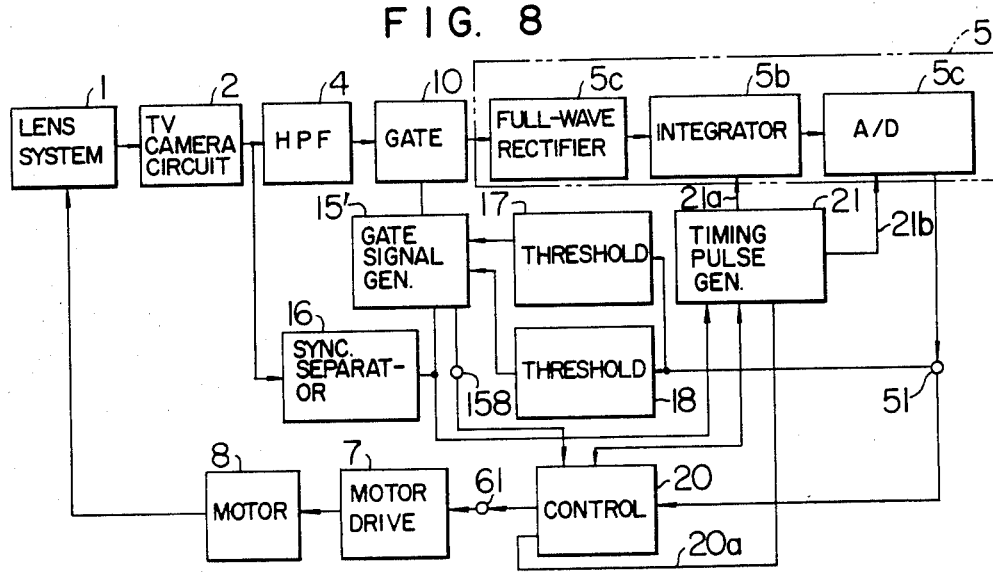
FIG. 8 is a block diagram showing still another embodiment of the invention.

Still another embodiment of the invention will be described in detail with reference to FIGS. 8, 9 and 10. In FIG. 8, the constituents with reference numbers 1–5, 7, 8, 10, and 15'–18 are the same as those shown in FIG. 5. The detector 5, in this embodiment, consists of a full-wave rectifier 5a, an integrator 5b and an A/D converter 5c. The arrangement further includes a control circuit 20 which functions similarly to the difference holding circuit 6 in FIG. 5 in digital fashion (for details of this circuit, refer to U.S. Pat. No. 4,320,417, entitled, "Automatic Focusing System for Video Camera", assigned to the applicant of the present invention) and a timing generator 21. The output 158 of the gate signal generator 15' indicates the gain switching to the control circuit 20. The timing generator 21 provides reset pulses 21a (FIG. 9, (a)) for the integrator 5b and conversion timing pulses 21b (FIG. 9, (d)) for the A/D converter 5c at an interval of the vertical sync signal in the TV signal. The integrator 5b integrates the input signal during a certain period which ends when a reset pulse is issued by the circuit 21 so as to form a signal representing the difinition of the picture at each interval of the vertical sync signal. The reason why the detector 5 is so arranged is that the focus signal is reset to the initial value at each vertical sync signal to minimize the time constant of the detector 5 thereby to produce the focus signal for each picture exactly responsive to the lens position at that time. The gate circuit 10 may be placed between the full-wave rectifier 5a and the integrator 5b. The output of the integrator 5b will be termed "focus signal" hereinafter. The A/D converter 5c converts the analog voltage signal from the integrator 5b into digital signal and supplies it to the control circuit 20.

Figure 9:
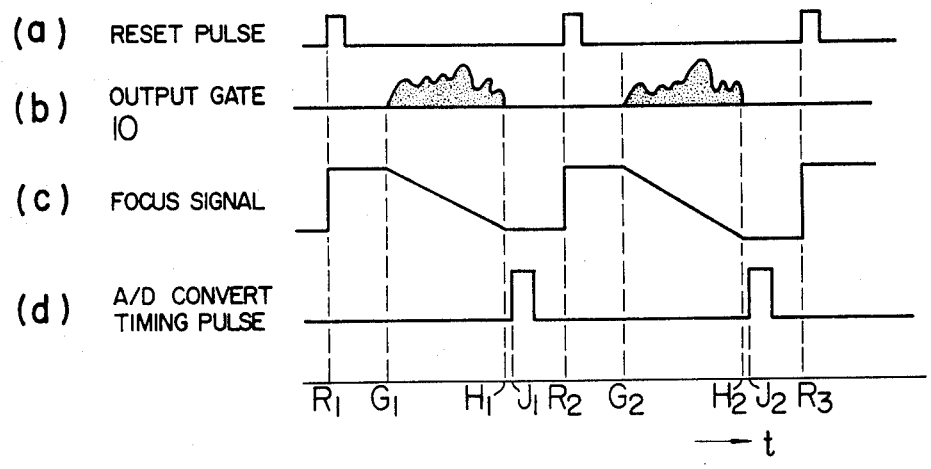
FIG. 9 is a chart showing the waveforms observed at various portions of the arrangement shown in FIG. 8.
Figure 10:
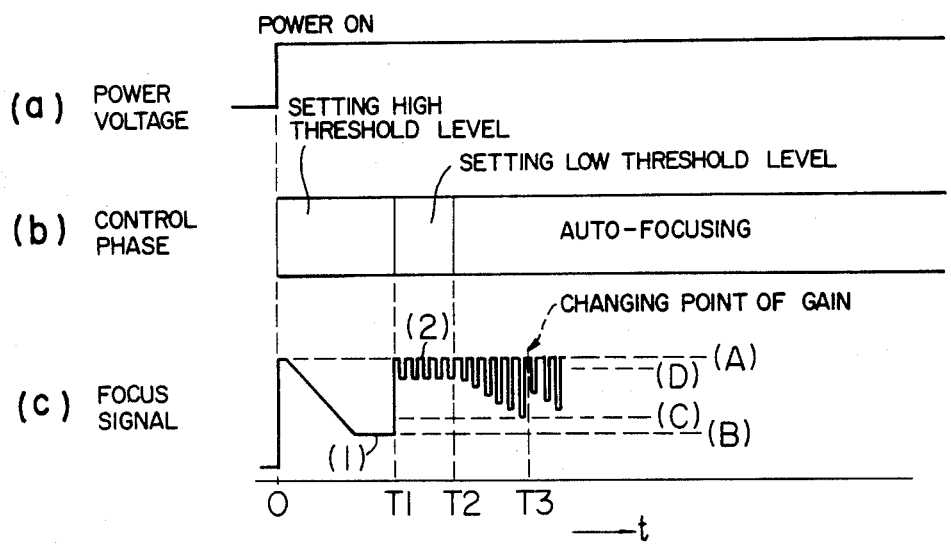
FIG. 10 is a timing chart useful to explain the automatic threshold setting performed by the embodiment of FIG. 8.

FIG. 9 (b) shows the envelope of the output signal from the HPF 4, which is actually made up of numerous fine pulses on the order of microseconds each representing a profile in the picture. The envelope waveforms exist only during a limited period of G1–H1 and G2–H2, since the gate circuit 10 conducts video signals corresponding to the central portion of the screen in accordance with the programmable decoder 152 in FIG. 5 as mentioned previously.

When the gate 10 is conductive, the arrangement including the lens system 1 through the detector 5 operates identically to those of the conventional auto-focusing system as described in connection with FIG. 5, with the exception that the detector output is converted signal by the A/D converter 5c into a digital voltage representing the definition of the picture which appears at terminal 51 (FIG. 9, (c)), and threshold circuits 17 and 18 and a control circuit 20 executes a digital processing. If this digital voltage is at the saturation level of the detector 5, which is mainly determined by the saturation level of the integrator 5b, the gate signal generator 15', in response to the output of the threshold circuit 17 and with reference to the horizontal and vertical sync signals from the sync separator 16, operates on the gate circuit 10 to conduct video signals for less horizontal scanning lines so as to reduce input signals to the detector 5. Conversely, if the output of the detector 5 is at the null signal level, the gate signal generator 15, in response to the output of the threshold circuit 18 and with reference to the horizontal and vertical sync signals from the sync separator 16, operates on the gate circuit 10 to conduct video signals for more horizontal scanning lines so as to increase input signals to the detector 5. In this case, the number of operations of the gate circuit 10 is switched each time the detector output exceeds the threshold value. Thus the output of the detector 5 is controlled to have the optimum voltage level and the control circuit 20 maintains a satisfactory condition for determination, whereby the ascending operation on the curve of the focus signal is carried out without failure. In the operation, however, the focus signal immediately following the switching of the number of gate operations cannot provide a difference with the successive focus signal. This is because the difference between the two focus signals includes the difference of number of gate operations more than the component caused by the variation of the definition produced by the movement of the lens system 1, resulting in an incorrect determination. Therefore, in this case, the ascending operation should be restarted with the focus signal immediately following the switching of the number of gate operations being set as the initial value. The motor may be stopped temporarily before and after this operation, or may be kept running in the same direction.

The following will describe how to set the threshold values for the threshold circuits 17 and 18. The threshold values can be set to predetermined fixed values if the saturation level and null signal level of the detector 5 are stable against environmental changes such as the ambient temperature or if the detector 5 has a sufficient dynamic range for allowing a margin of threshold setting. However, these conditions are not generally met in practical design, and it is desirable to set the threshold values appropriately so that the dynamic range of the detector 5 is fully used in operation.

The means for setting the threshold values will be described in connection with FIG. 10. In FIG. 10 (c), levels (A) and (B) define the dynamic range of the detector which is restricted by the power voltage, where (A) is the null signal level and (B) is the saturation level. When the auto-focusing system is turned on (see FIG. 10 (a)), the set up control is carried out for the threshold circuit 17 as shown in FIG. 10 (b). More particularly, the control circuit 20 issues an integrator reset inhibit signal 20a to the timing generator 21, which then suspends the output of the reset signal (see FIG. (a)) to the integrator 5b during the period of 0-T1. Then, the output of the integrator 5b, which is normally reset at each vertical sync signal to provide the null signal level (A), comes to the saturation level (B) after a certain while as shown by (1) in FIG. 10 (c). Accordingly, the voltage received by the A/D converter 5c on expiration of that time can be assumed to be the saturation level (B). The threshold circuit 17 is set to this voltage or the voltage added by a margin (i.e., level (C)) as the saturation threshold value (high threshold value). After the higher threshold has been set, the integrator reset inhibit signal from the control circuit 20 goes off (at T2), then control proceeds to the setting of the threshold circuit 18 as shown in FIG. 10 (b). The integrator 5b is reset at each vertical sync signal and provides the output as shown by (2) in FIG. 10. The output of the integrator 5b is subjected to A/D conversion repeatedly by the circuit 5c in response to the command from the control circuit 20 at a period of about 2 ms which is shorter than the period of the vertical sync signal, and the minimum value of the converted voltage or the value added by a margin (i.e., level (2)) is set as the null signal threshold value (low threshold value) in the threshold circuit 17. After the threshold circuits 17 and 18 have been set, control proceeds to the ascending operation as shown in FIG. 10 (b), and the auto-focusing is started.

During the ascending operation in accordance with the threshold values, when the output of the integrator 5b exceeds the level (C) of FIG. 10 (at T3), the threshold circuit 17 operates on the gate circuit 10 to reduce input signals to the detector 5, and if the integrator output goes down below the level (D), the threshold circuit 18 operates on the gate circuit 10 to increase input signals to the detector 5. This threshold setting is carried out each time the auto-focusing system is turned on and also when the thermometer detects the temperature variation inside the system. Thus the automatic gain control circuit operates stably even if the dynamic range of the detector varies due to unequal circuit components and the like. The control circuit 20 is known in the art and the explanation thereof is omitted. (Refer to the abovementioned U.S. Pat. No. 4,320,417.)

Next, the following will describe an embodiment wherein the control circuit 20, the threshold circuits 17 and 18, the timing generator 11, and part of the gate signal generator 15′ shown in FIG. 8 are replaced with a microcomputer. The microcomputer used here may be a general purpose microcomputer available in the market such as, for example, a 4-bit microcomputer HMCS-44 or HMCS-45 manufactured by Hitachi, Ltd.

Figures 11, 12:
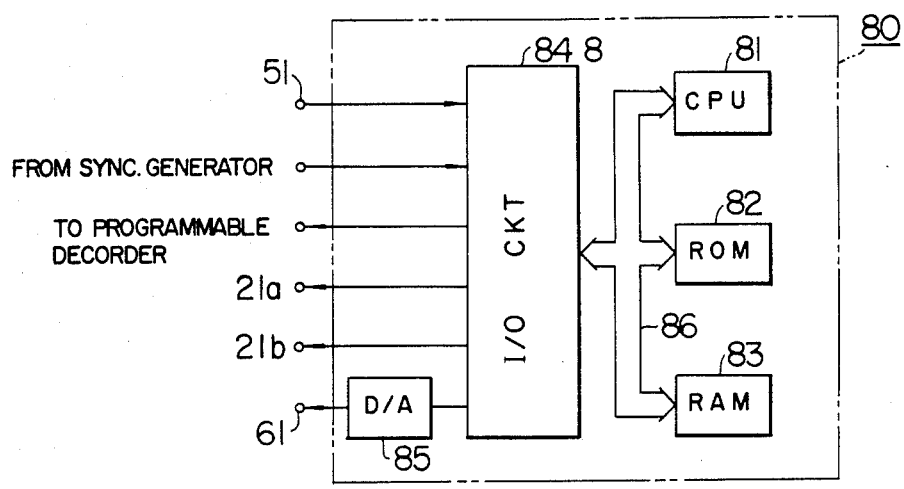
FIG. 11 is a simplified block diagram of the microcomputer.
FIG. 12 is a table showing the contents of the RAM incorporated in the microcomputer.

FIG. 11 shows in brief the structure of the microcomputer. The microcomputer generally shown by 80 includes the equivalent functions of the control circuit 20, the threshold circuits 17 and 18, and the timing generator 21 shown in FIG. 8, and further, part of the gate signal generator 15′ including the up/down counter 153, the detector 155 and the gate circuits 156 and 157 shown in FIG. 7. In this embodiment, the gate signal generator is constituted by a counter 151, a programmable decoder 152 and an AND gate 154. The microcomputer 80 is a general purpose device including a CPU 81, a ROM 82, a RAM 83, an I/O circuit 84, a D/A converter 85, and a bus 86. The ROM 82 stores the program for automatic focusing, the program for gain control (gate control), and the program for setting the initial threshold values for the gain control.

The following will describe the program for gain control and the program for setting the initial threshold values for the gain control. FIG. 12 shows part of the storage area of the RAM 83, where the locations with addresses 100-106 store data, in a certain number of bits, representing the current focus signal, the previously A/D converted focus signal, the maximum focus signal, the minimum focus signal, the high threshold value, the low threshold value, and the current gain (i.e., the signal controlling the number of operations of the gate 10), respectively. Data stored in addresses 104 and 105 correspond to the threshold values for the threshold circuits 17 and 18 shown in FIGS. 5, 7 and 8 in the previous embodiment, and data stored in address 106 corresponds to the contents of the up/down counter 153 shown in FIG. 7. The current focus signal stored in address 100 corresponds to the digital focus signal provided by the A/D converter shown in FIG. 8.

Figure 13:
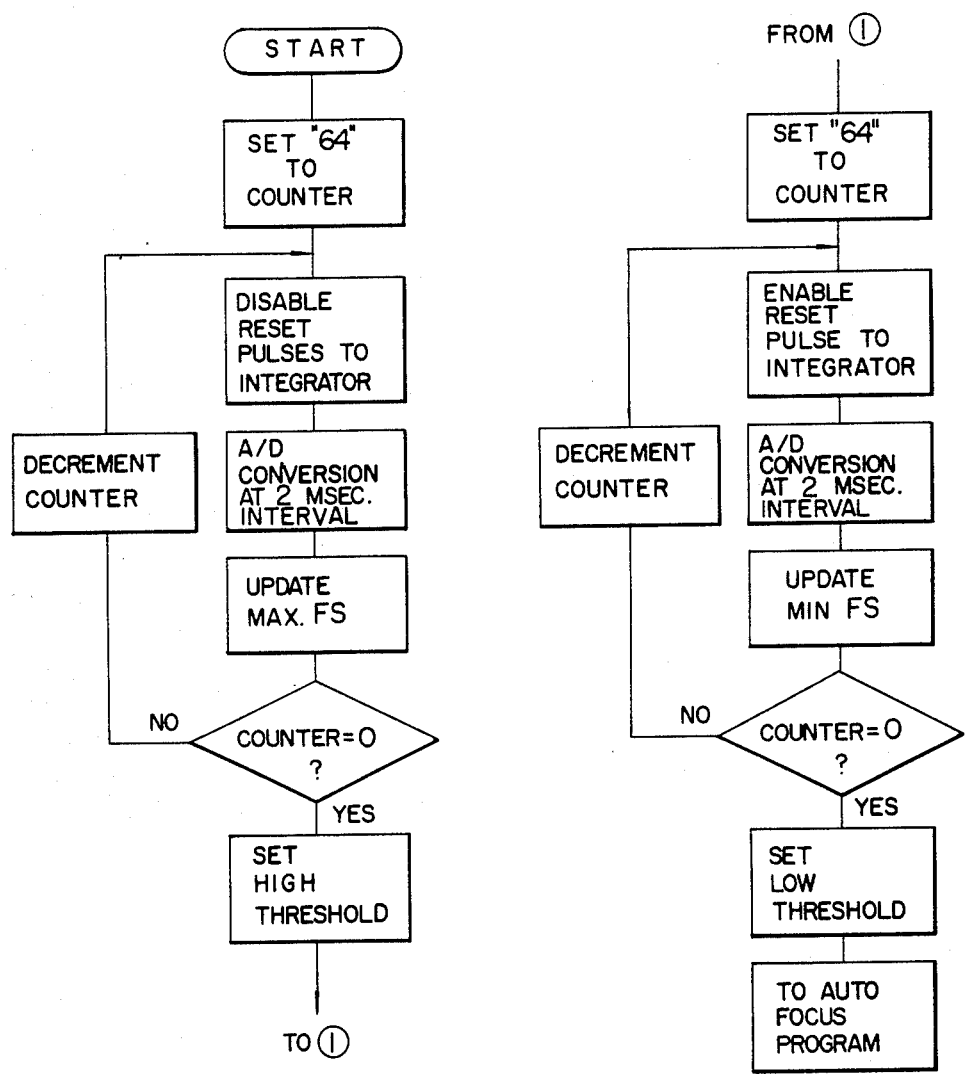
FIG. 13 is a flowchart of the program stored in the microcomputer for carrying out the initial setting of the threshold levels.

Referring to FIG. 13, the program for setting the initial threshold values is initiated by turning on the video camera, and the high threshold value will first be set. An integer, e.g., "64", is set to an appropriate counter within the microcomputer 80. Then, the microcomputer 80 disables the output of the integrator reset pulse 21a to the integrator 5b and provides timing pulses in a period of about 2 ms to the A/D converter 5c. In response to each timing signal, the focus signal is stored in address 100 and at the same time the maximum focus signal in address 102 is updated. Next, the contents of the counter which has been set previously are checked, and if it contains nonzero, it is decremented by one and the same operation is repeated. When the counter contents become zero, the high threshold value is set basing on the maximum focus signal stored in address 102 and it is stored in address 104.

Subsequently, the initial low threshold value will be set. First, integer "64" is set in an appropriate counter within the microcomputer 80. Then, the integrator reset pulse 21a to the integrator 5b is enabled, and timing pulses in a period of about 2 ms are provided for the A/D converter 5c. Then, the focus signal provided by the A/D converter 5c is stored in address 100 and the minimum focus signal in address 103 is updated. Here, the updating signifies that data stored in addresses 100 and 103 are compared and the contents of address 103 are replaced by the smaller one. Next, the contents of the counter are checked, and if it contains nonzero, it is decremented by one and the same operation is repeated. When the counter contents become zero, the low threshold value is set basing on the minimum focus signal in address 103, and it is stored in address 105. Upon completion of the program for setting the initial threshold values, the program for auto-focusing will be executed.

Figure 14:
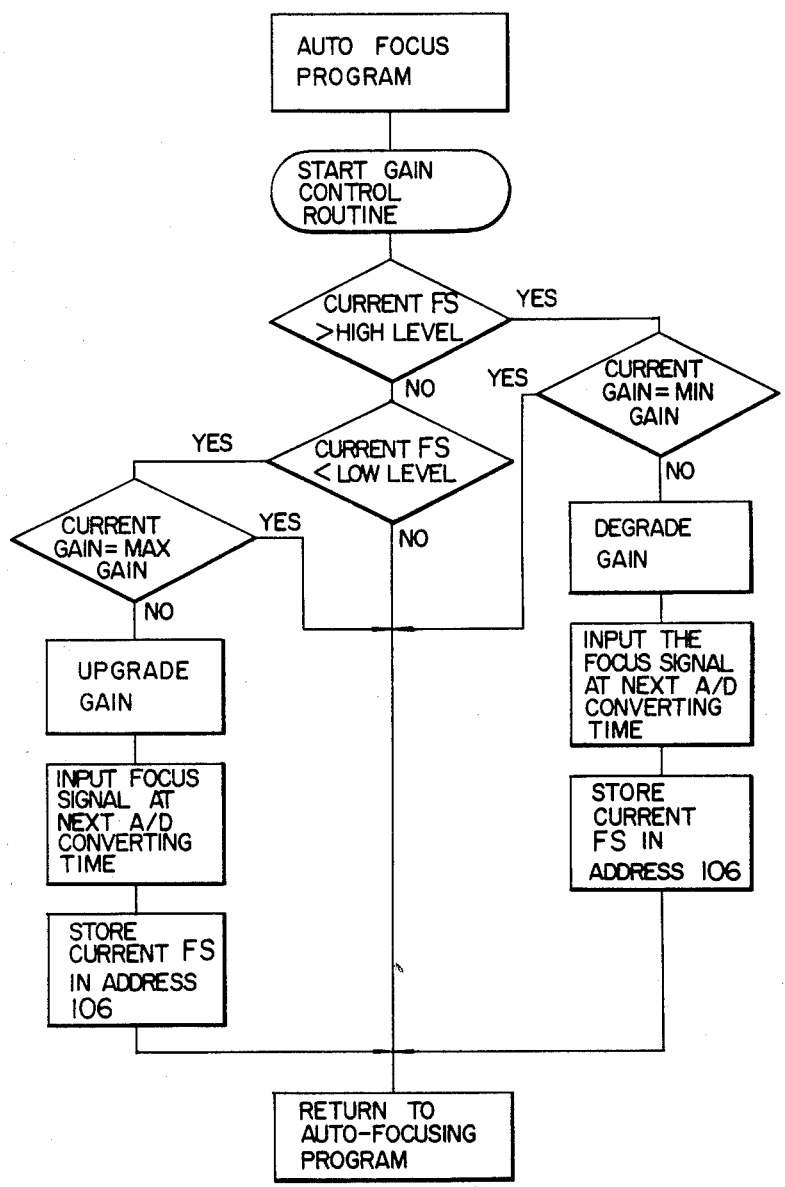
FIG. 14 is a flowchart of the program stored in the microcomputer for carrying out the gain control.

When the program for auto-focusing (this program is not related to the invention and will not be described here) has started, the micro-processor receives the focus signal from the A/D converter 5c. Upon reception of the focus signal, the gain control routine is initiated as shown in FIG. 14. The focus signal is stored in address 100 of the RAM 83 as a current focus signal and at the same time it is compared with the high threshold value which has been set previously. If the signal is smaller than the high threshold value, it is compared with the low threshold value. If the signal is larger than the low threshold value, control returns to the auto-focusing program without changing the current gain stored in the RAM 106. If the signal is larger than the high threshold value, the current gain (which is stored in address 106 of RAM 83 and controls the number of operation of the gate 10) is checked whether it is the minimum value or not. If the current gain is found minimum, control returns to the auto-focusing program. If it is not the minimum gain, the current gain stored in address 106 is degraded by one step. In response to the next timing pulse from the A/D converter, the microcomputer receives a digital focus signal and stores it in address 101 as a previous focus signal, then control returns to the auto-focusing program.

Returning to the earlier stage of the gain control routine, if the focus signal is found smaller than the low threshold value, the current gain stored in address 105 of the RAM 83, i.e., the number of gate operations, is checked whether it is maximum or not. If the current gain is found maximum, control returns to the auto-focusing program. If it is not the maximum gain, it is upgraded by one step and stored in address 106. Then, in response to the next timing signal the contents of address 106 is converted into digital signal and stored in address 101 as a previous focus signal.

It will be understood from the foregoing description how the number of operation of the gate 10 is controlled and initial threshold values are set using the microcomputer.

According to the present invention, as described above, the optimum focus signal level can be obtained by controlling the input to the detector even for the case where a satisfactory ascending operation could not be carried out in the conventional system due to an insufficient dynamic range of the detector, and a satisfactory ascending operation is made possible. Moreover, the threshold values for switching the gain are re-set each time the system is turned on and, consequently, the gain switching control is not affected by unequal circuit components and variation of characteristics due to ageing and the thermal environment.

We claim:

1. In an auto-focusing system for a video camera comprising:
   a video camera for providing a video signal;
   focus signal extracting means for receiving the video signal from said video camera and for extracted a focus signal representing the degree of matching of focusing and providing an output indicative thereof; and
   control means responsive to said focus signal extracting means for controlling the lens system of said video camera so that the output of said focus signal extracting means has a predetermined value, the improvement comprising:
   gate means connected between said video camera and said focus signal extracting means; and
   gate control signal generating means responsive to at least one of said video camera and said focus signal extracting means for generating signals which make said gate means conductive or non-conductive depending on the quantity of high-frequency components included in said video signal.

2. An auto-focusing system according to claim 1, wherein said gate control signal generating means comprises counter means for receiving said video signal from said video camera and for counting the number of profiles of a picture seen in the horizontal scanning direction in said video signal.

3. An auto-focusing system according to claim 2, wherein said counter means comprises:
   a low-pass filter for receiving said video signal from said video camera;
   a differentiating circuit connected to said low-pass filter;
   a threshold circuit connected to said differentiating circuit; and
   a counter connected to said threshold circuit.

4. An auto-focusing system according to claim 3, wherein said counter is cleared at an interval of one field of said video signal.

5. An auto-focusing system according to claim 1, wherein said gate control signal generating means comprises:
   threshold means for varying the output of said focus signal extracting means; and
   a gate signal generating circuit for receiving the output of said threshold means and for varying the period of the conductive and non-conductive operation of said gate means in response to the output of said threshold means.

6. An auto-focusing system according to claim 5, wherein said threshold means comprises a first threshold circuit having a threshold value in proximity of the saturation level of said focus signal extracting means and a second threshold circuit having a threshold value in proximity of the null level of said focus signal extracting means.

7. An auto-focusing system according to claim 5 or 6, wherein the conductive period of said gate means is substantially equal to a horizontal scanning period and the non-conductive period of said gate means is integral multiples (including zero) of said horizontal scanning period.

8. In an auto-focusing system for a video camera comprising:
  a video camera;
  a high-pass filter which receives a video signal from said video camera and filters high frequency components of said video signal;
  a means which receives the output of said high-pass filter and extracts a focus signal representing the degree of matching of focusing from said high-frequency components of said video signal; and
  a control means which receives the output of said extracting means and controls a motor for driving a lens system of said video camera so that said focus signal is made maximum, the improvement comprising:
  a gate connected between said high-pass filter and said focus signal extracting means; and
  a means which receives said focus signal and provides said gate with a control signal for picking off outputs of said high-pass filter in units of horizontal scanning lines of said video signal in response to the amplitude of said focus signal.

9. An auto-focusing system according to claim 8, wherein said control signal supply means comprises:
  a means for comparing said focus signal with a threshold value; and
  a gate signal generating means which receives the output of said comparison means and generates conductive or non-conductive operation signal for said gate in response to said output of said comparison means.

10. An auto-focusing system for a video camera according to claim 8 or 9, wherein said focus signal extracting means comprises a rectifier connected to said high-pass filter and an integrating circuit connected to said rectifier, said system further comprising a timing pulse generating circuit which generates pusles for resetting said integrating circuit at an interval of one field of said video signal.

11. An auto-focusing system for a video camera wherein said video camera is focused automatically by moving the lens system of said camera by a motor, comprising:
  a means for extracting a focus signal representing the degree of matching of focusing of said video camera from a video signal from said video camera;
  a gate means for conducting or non-conducting said video signal to said focus signal extracting means; and
  a control means which receives said focus signal from said focus signal extracting means and provides a first control signal for auto-focusing to a drive means for said motor and provides said gate means with a second control signal for introducing said video signal in units of horizontal scanning lines depending on the magnitude of said focus signal.

12. An auto-focusing system for a video camera according to claim 11, wherein said gate means comprises:
  a gate connected in a signal path of said video signal; and
  a gate signal generating circuit which receives said second control signal from said control means and provides gate pulses to said gate so that said gate is made conductive or non-conductive.

13. An auto-focusing system for a video camera according to claim 12, wherein said gate signal generating circuit comprises:
  a counter which counts the horizontal sync signal of said video signal and is cleared by the vertical sync signal of said video signal; and
  a programmable decoder which receives the parallel output of said counter and provides gate pulses for making said gate conductive or non-conductive in response to said second control signal.

14. An auto-focusing system for a video camera according to claim 11, 12 or 13, wherein said control means stores a high threshold value in proximity to the saturation level of said focus signal extracting means and a low threshold value in proximity to the null signal level of said focus signal extracting means, said control means including comparing means for comparing said focus signal with said first and second threshold values and for providing said second control signal.

15. An auto-focusing system for a video camera according to claim 14, wherein said focus signal extracting means comprises at least an integrating circuit, said control means generating a third control signal for controlling the integration period of said integrating circuit.

* * * * *